United States Patent [19]

Saito

[11] Patent Number: 4,855,839
[45] Date of Patent: Aug. 8, 1989

[54] FACSIMILE MACHINE WITH A PAPER SIZE ADJUSTABLE PROXY RECEPTION FUNCTION

[75] Inventor: Yuichi Saito, Hadano, Japan

[73] Assignee: Ricoh Company, Ltd., Tokyo, Japan

[21] Appl. No.: 131,359

[22] Filed: Dec. 10, 1987

[30] Foreign Application Priority Data

Dec. 10, 1986 [JP] Japan .................. 61-292407

[51] Int. Cl.⁴ .............. H04N 1/21; H04N 1/32; H04N 1/40; H04N 1/04
[52] U.S. Cl. .................. 358/296; 358/434; 358/443; 358/449
[58] Field of Search ............... 358/296, 257, 280, 287

[56] References Cited

U.S. PATENT DOCUMENTS 4,731,658  3/1988  Koseki .................. 358/287

Primary Examiner—E. A. Goldberg
Assistant Examiner—Scott A. Rogers
Attorney, Agent, or Firm—Oblon, Spivak, McClelland, Maier & Neustadt

[57] ABSTRACT

A facsimile machine provided with a proxy reception function is so structured to send the information regarding the paper size of recording paper currently in use prior to transmission of image information. With this structure, the image received in a proxy reception mode can be recorded on recording paper properly at all times.

5 Claims, 4 Drawing Sheets

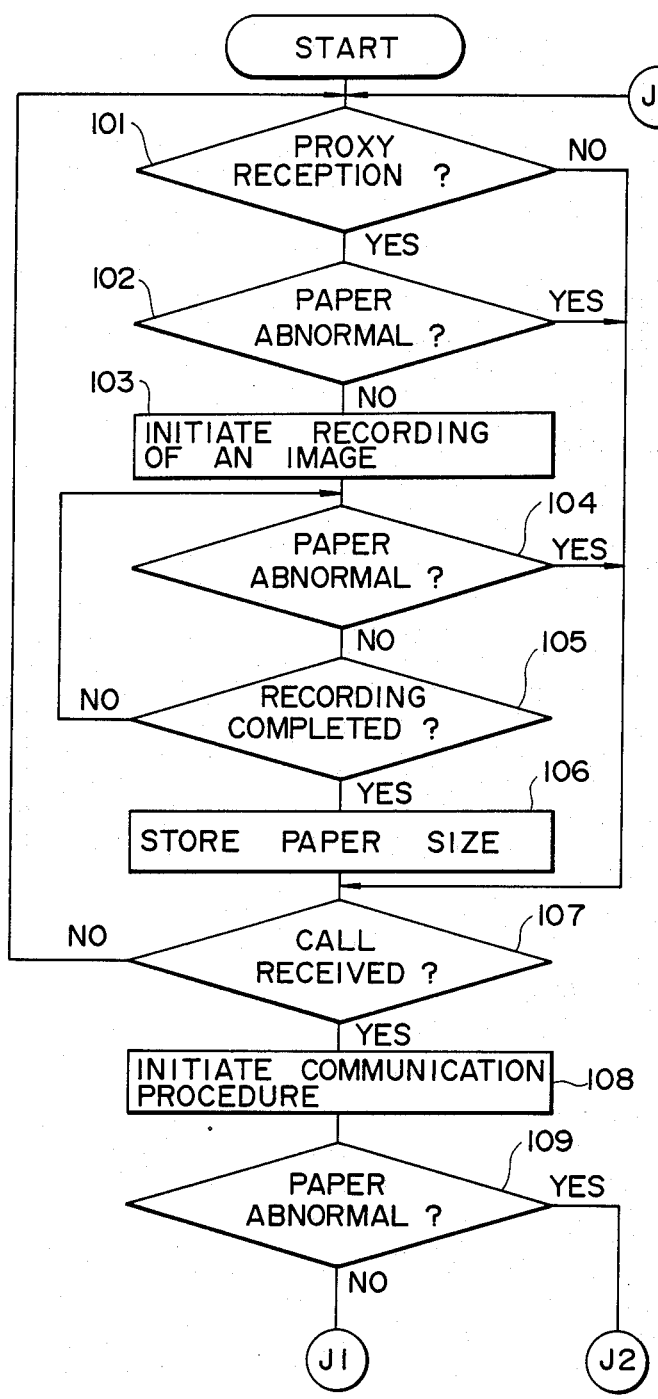

FACSIMILE MACHINE WITH A PAPER SIZE ADJUSTABLE PROXY RECEPTION FUNCTION

BACKGROUND OF THE INVENTION

1. Field of the Invention

This invention generally relates to a facsimile machine, and, in particular, to a facsimile machine having a proxy reception function

2. Description of the Prior Art

A modern facsimile machine is provided with a memory for temporarily storing image information. In such a facsimile machine with an image memory, various useful functions may be realized One of such useful functions is a proxy reception function, according to which, when malfunctioning relating to recording paper used in a recording device of the facsimile machine occurs, such as paper jamming or absence of paper, the received image information is automatically stored in a memory. Thus, such a facsimile machine with a proxy reception function is extremely useful because the facsimile machine can be operated automatically unattended When proxy reception is to be carried out, the information relating to the size of recording paper which may be used for recording of image information received by proxy reception at the receiver is transmitted to the transmitter (calling station). In this case, however, there is a case in which the size of the recording paper usable for proxy reception differs from the size of the recording paper which is commonly used and thus normally expected to be used at the receiver facsimile machine. For example, in a facsimile machine capable of using either of recording paper having width A corresponding to A4 size and recording paper having width B corresponding to B4 size, the recording paper having width A may be set or predetermined as a standard size for proxy reception. In such a case, even if the recording paper having width B has been normally used in the facsimile machine, the size of the recording paper to be used for recording will be indicated to the transmitter as the one having width A at the time of proxy reception because the recording paper having width A has been previously set as a standard size for the proxy reception operation.

Under the circumstances, if an original to be transmitted has the B4 size, the image of the original is scaled down or reduced in size to A4 size by the transmitter before being transmitted to the receiver. Thus, when the image is received by the receiver facsimile machine in a proxy reception mode, the image is stored in a memory as reduced in size. Thus, if such a proxy reception has taken place due to the absence of paper, the operator is most likely to set recording paper having width B because it is the paper which is normally used in this receiver facsimile machine. As a result, the received image having a reduced size of A4 is recorded on the recording paper having size B which has just been set.

In this manner, in accordance with the prior art, even if a facsimile machine is capable of receiving image information having the B4 size, the image is automatically reduced in size to the A4 size since the A4 size has been fixed as a standard size for proxy reception. Thus, there has been an inconvenience during the prior art proxy reception mode because the size of recording paper to be used during the proxy reception mode is fixed.

SUMMARY OF THE INVENTION

In accordance with the principle of the present invention, there is provided a facsimile machine which includes a paper size storing means for storing the size of recording paper which has so far been used. During a proxy reception mode, the size information stored in the paper size storing means is transmitted to a calling station as the size of recording paper usable for the proxy reception.

It is therefore a primary object of the present invention to obviate the disadvantages of the prior art as described above and to provide an improved facsimile machine.

Another object of the present invention is to provide an improved facsimile machine having a memory for temporarily storing image information.

A further object of the present invention is to provide an improved facsimile machine having a proxy reception function.

A still further object of the present invention is to provide an improved facsimile machine capable of recording received image information without inconveniences.

Other objects, advantages and novel features of the present invention will become apparent from the following detailed description of the invention when considered in conjunction with the accompanying drawings.

BRIEF DESCRIPTION OF THE DRAWINGS

FIGS. 2a and 2b show flow charts which are useful for understanding the operation of the structure shown in FIG. 1.

DESCRIPTION OF THE PREFERRED EMBODIMENTS

Figure 1:
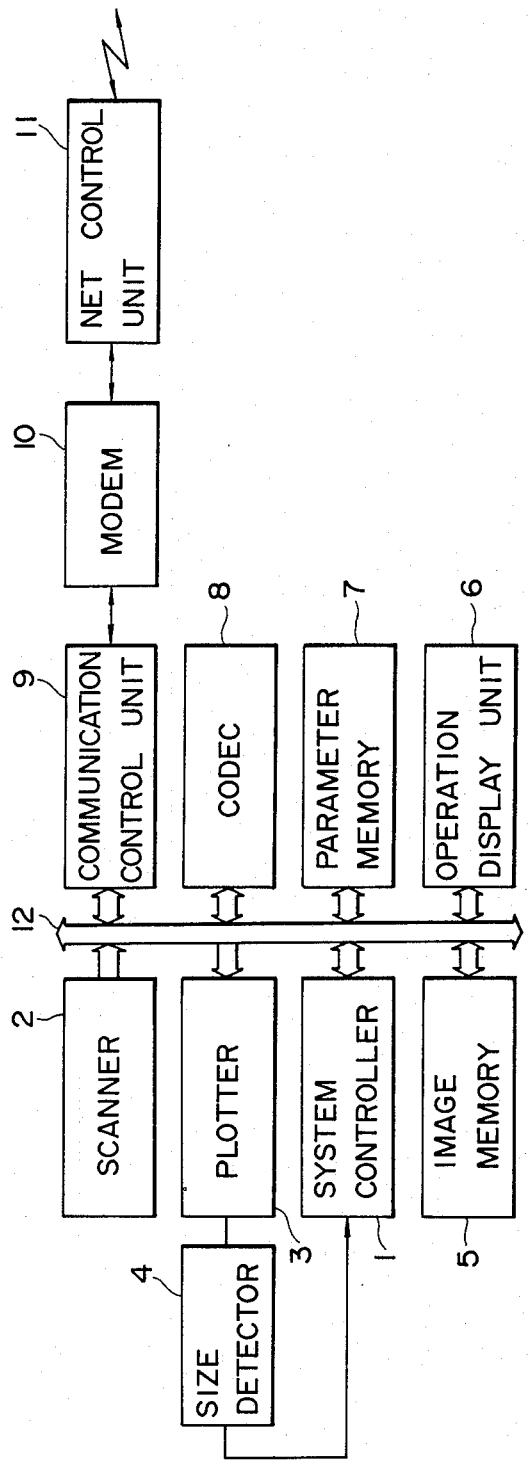
FIG. 1 is a block diagram showing a facsimile machine constructed in accordance with one embodiment of the present invention.

Referring now to FIG. 1, there is shown in block form a facsimile machine constructed in accordance with one embodiment of the present invention. As shown, the present facsimile machine includes a system controller 1 for controlling the overall operation of the facsimile machine, a scanner 2 for optically reading an original image at a predetermined resolution, and a plotter 3 for recording received image information on a recording medium, such as recording paper, at a predetermined resolution. In the present embodiment, it is so structured that a plurality of recording paper different in size, such as a roll of recording paper having width A and a roll of recording paper having width B, may be set in the plotter 3 selectively.

Also provided is a size detector 4 for detecting the size of the recording paper set in the plotter 3, and detected size information is supplied to the system controller 1. An image memory 5 is also provided for temporarily storing received image information as transmitted from the transmitter, whereby the received image information is typically compressed by coding. An operation display unit (or control panel) 6 is provided with various operation keys and also with a display device having a high degree of freedom in display for displaying various information, such as guidance information for various operations, and a parameter memory 7 is provided for storing various data, such as paper size detected by the size detector 4. Preferably, the parameter memory 7 is comprised of a non-volatile memory device, such as a CMOS RAM with a battery back-up.

Also provided is a CODEC 8 which compresses image data by coding and decompress compressed image data into the original image data by decoding. A communication control unit 9 serves to carry out communication of image with another facsimile machine by executing a predetermined facsimile communication control procedure, and a MODEM 10 serves to modulate or demodulate an image signal so as to allow to use the public telephone network, which is an analog transmission network, as a transmission line. And, a net control unit 11 serves to connect the facsimile machine to the public telephone network. In the present embodiment, the net control unit 11 is provided with an automatic calling and call receiving function. The system controller 1, scanner 2, plotter 3, image memory 5, operation display unit 6, parameter memory 7, codec 8, and communication control unit 9 are interconnected through a bus line 12.

Figure 2B:
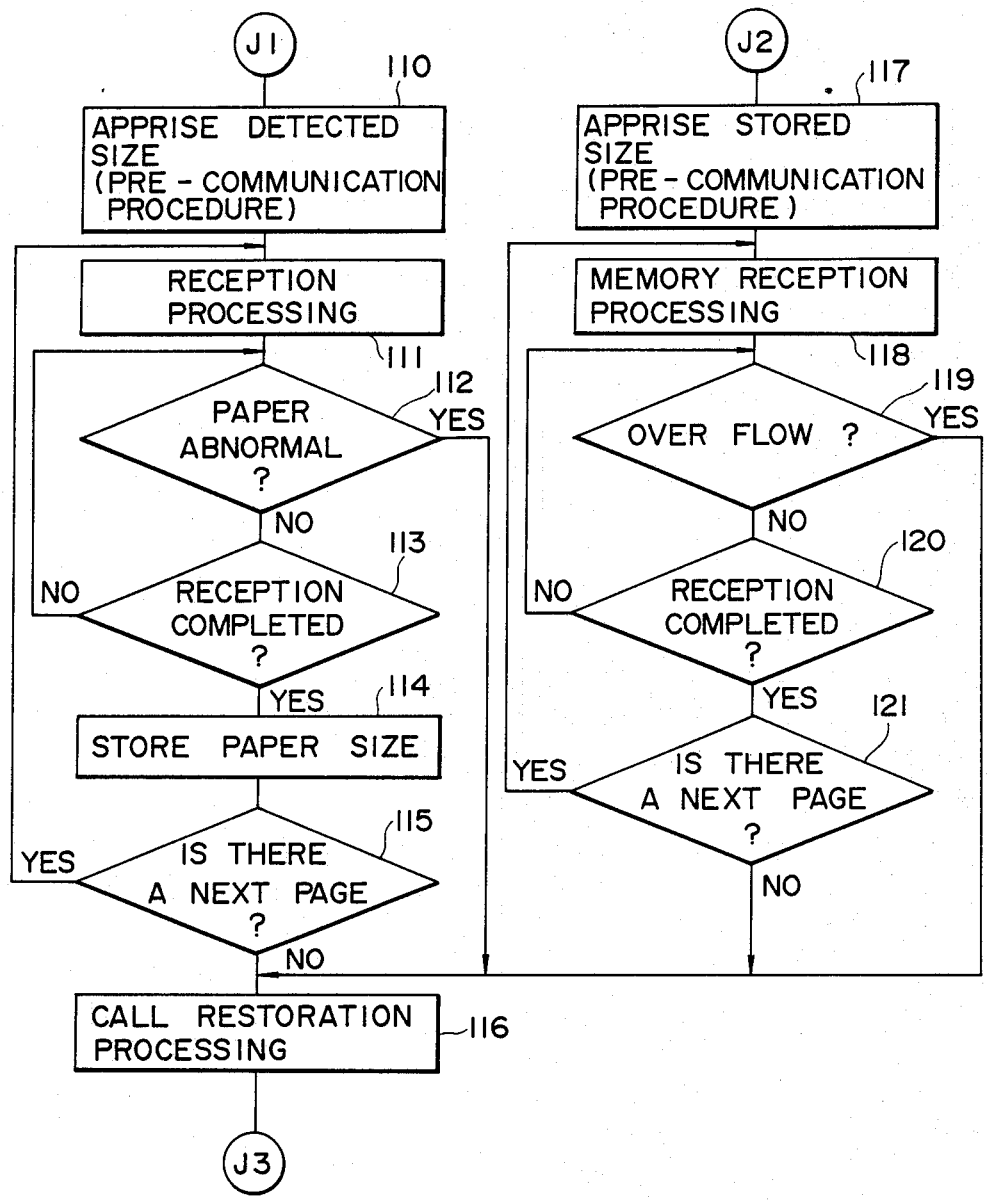

With the above-described structure, the system controller 1 executes a procedure shown in FIGS. 2a and 2b so as to record image information received by an ordinary reception process or by a proxy reception process. It is to be noted that the system controller 1 handles various other process operations; however, these other process operations will not be described here because they are not directly related to the present invention.

In the first place, it is checked to see whether received image information is stored in the image memory 5 by proxy reception (step 101). If the result of determination at step 101 is affirmative, it is checked to see whether or not any paper abnormality condition, such as absence of paper or paper jamming, is present at the plotter 3 (step 102). If the result of the determination at step 102 is affirmative, then the received image information stored in the image memory 5 is restored to the original image signal by the codec 8, and, then, the image signal is transferred to the plotter 3 while monitoring the occurrence of any paper abnormality condition at the plotter 3, thereby recording the received image information on recording paper (steps 103 through 105). And, then, if all of the received image information has been recorded safely, the paper size information which is detected by the size detector 4 is stored into a particular memory region of the parameter memory 7 (step 106).

In this manner, upon recording of the received image information which has been received by proxy reception, it is checked whether or not a call has been received (step 107). If the result of determination at step 107 is negative, it goes back to step 101. If the results of determinations at steps 101, 102 and 104 are negative, affirmative and affirmative, respectively, it skips to step 107. Thus, after executing the NO loop from step 101 or 107, it waits for the arrival of a call. Until the paper abnormality condition in the plotter 3 is obviated after proxy reception, it enters into the stand-by condition which executes the loop defined by the YES condition of step 101, YES condition of step 102 and NO condition of step 107. Under the condition, if the result of determination at step 107 becomes YES upon detection of a call, it initiates a predetermined facsimile communication procedure upon establishment of connection to the network (step 108). Then, under the condition, it is checked whether or not any paper abnormality condition is present at the plotter 3 (step 109).

If the result of determination at step 109 is negative, the paper size detected by the size detector 4 is reported as a size of the paper to be used for recording to the transmitter during a pre-communication procedure (step 110). And, then, a predetermined reception process is initiated (step 111) and then the received image information is restored to the original image signal by the codec 8 while monitoring the occurrence of a paper abnormality condition at the plotter 3. The thus restored image signal is then transferred to the plotter 3 to thereby have one page of received image recorded on recording paper (steps 112 and 113). Upon completion, the paper size information currently detected by the size detector 4 is stored into a particular memory region of the parameter memory 7 (step 114). And, if there is any following page to be received, it returns to step 111, i.e., the result of determination at step 115 being YES. Upon completion of reception of the entire image to be received (i.e., the result of determination at step 115 being NO), a predetermined call restoration process is carried out at step 116 to thereby terminate the image reception operation.

On the other hand, if the result of determination at step 109 is affirmative, since it is the case for carrying out a proxy reception operation, the paper size currently stored in the parameter memory 7 is reported to the transmitter as a size of the paper to be used for recording during the pre-communication procedure (step 117). And, then, a predetermined memory reception process is initiated (step 118), and one page of received image information is stored into the image memory 5 while monitoring the overflow condition of the image memory 5 (steps 119 and 120). If there is any following page to be received (i.e., the result of determination at step 121 being YES), it returns to step 118. Upon completion of reception of the entire image (i.e., the result of determination at step 121 being NO), a predetermined call restoration process is carried out at step 116 to complete the image reception operation.

In this manner, upon completion of the call restoration process at step 116, it returns to step 101. On the other hand, if a paper abnormality condition occurs during a normal image reception operation and thus the result of determination at step 112 becomes affirmative, and if the image memory 5 overflows during image reception and thus the result of determination at step 119 becomes affirmative, it jumps to the call restoration process step 116 to discontinue the image reception operation immediately. In this manner, if the received image has been properly output and recorded on recording paper, the paper size information stored in the parameter memory 7 is renewed each time by the paper size detected by the size detector 4 at that time. And, if proxy reception is to be carried out, the paper size information stored in the parameter memory 7 is reported to the transmitter as a size of recording paper usable for reception of image information. As a result, during proxy reception, the size of recording paper in use is always reported to the transmitter, when the image information received in a proxy reception mode is output and thus recorded on recording paper, there can be obtained a recorded image of an image received in a proxy reception mode same in quality as that of a recorded image of an image received in an ordinary reception mode.

Figure 3:
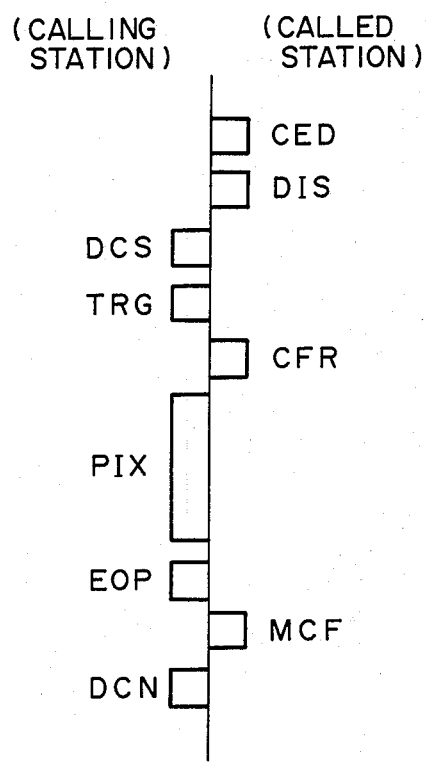
FIG. 3 is a timing chart showing the fundamental example of a facsimile communication procedure which may be employed in the present invention.

Now, one example of a basic facsimile communication procedure will be described with reference to FIG. 3. In the first place, upon arrival of a call, the receiver facsimile machine, which has received a call and thus serves as a called station, responds by issuing a called station identification signal CED, which identifies the facsimile machine to be as a non-audio terminal (facsimile terminal), and, then, apprises the transmitter facsimile machine, serving as a calling station, of functions provided with the receiver facsimile machine by a digital identification signal DIS. In this instance, the size of recording paper usable for reception of image information is also apprised. When the calling station has received the paper size information usable for reception at the called station, the calling station sends a function to be used for transmission of image information to the called station by way of a digital command signal DCS. In this instance, as the size of an image, the paper size which has been reported from the called station to the calling station will be used.

Thereafter, a MODEM training TRG is carried out, and when the called station responds by a reception preparation confirmation signal CFR, the calling station initiates the transmission of image information PIX. In this instance, a difference between the paper size usable for image reception at the called station and the size of an original set at the calling station for transmission is examined. And, if the size of an original to be transmitted is larger than the paper size usable for image reception, the image information PIX to be transmitted is formed by reducing the image of the original to be transmitted so as to correspond to the paper size usable for image reception. And, then, upon completion of transmission of image information PIX (in the present embodiment, upon transmission of one page of image information PIX), an end of procedure signal EOP is sent from the calling station to the called station. Then, when the called station responds by sending a message confirmation signal MCF, the calling station sends a disconnection signal DCN to the called station to restore the network, thereby completing the communication procedure. With this, the called station also restores the network.

As described above, in accordance with the present invention, there is provided a paper size memory means for storing the size of recording paper which has been set in a recording device when the last preceding image has been recorded. And, when proxy reception is to be carried out, the paper size information stored in the paper size memory means is reported to the transmitter as the paper size usable for image reception, so that the paper size appropriate for the current use condition of the recording device of the receiver facsimile machine can be reported to the transmitter facsimile machine during a proxy reception operation. As a result, there can be obtained a recorded image of high quality even in a proxy reception mode.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims. It is to be noted that the present invention may also be applied to a facsimile machine which uses a page printer, such as a laser beam printer, using cut sheets of recording paper, as a plotter in place of a plotter which uses a roll of recording paper as described above.

What is claimed is:

1. A facsimile machine comprising:
   communication control means for controlling communication with another facsimile machine;
   first storing means for temporarily storing image information;
   recording means for recording the image information stored in said first storing means on recording paper, wherein recording paper having a predetermined size may be set in said recording means;
   detecting means for detecting the size of said recording paper set in said recording means;
   second storing means for storing the size detected by said detecting means; and
   a system controller for controlling the overall operation of said facsimile machine, said system controller sending the size stored in said second storing means to a transmitter as a paper size usable for image reception prior to transmission of image information from said transmitter when an abnormal condition regarding said recording paper is present in said recording means upon reception of a call from said transmitter.

2. The facsimile machine of claim 1, wherein said size stored in said second storing means is renewed every time when one unit of recording has been completed by said recording means.

3. The facsimile machine of claim 2, wherein said one unit of recording corresponds to recording of one page of image information.

4. The facsimile machine of claim 2, wherein said one unit of recording corresponds to recording of all of image information.

5. The facsimile machine of claim 1, wherein said second storing means includes a non-volatile memory.

* * * * *